United States Patent
Marshall et al.

[19]

[11] Patent Number: 6,023,330
[45] Date of Patent: Feb. 8, 2000

[54] CENTERED SPHERE SPECTROMETER

[75] Inventors: Kim Alvin Marshall, St. Joseph; Peter Markel Willis, Benton Harbor, both of Mich.

[73] Assignee: Leco Corporation, St. Joseph, Mich.

[21] Appl. No.: 09/217,274

[22] Filed: Dec. 21, 1998

[51] Int. Cl.[7] ................................................ G01J 3/18
[52] U.S. Cl. ........................................................ 356/328
[58] Field of Search .................................. 356/305, 326, 356/328, 334

[56] References Cited

U.S. PATENT DOCUMENTS

| | | | |
|---|---|---|---|
| 5,768,040 | 6/1998 | Macenka et al. | 356/328 |
| 5,880,834 | 3/1999 | Chrisp | 356/328 |

FOREIGN PATENT DOCUMENTS

| | | | |
|---|---|---|---|
| 2653879 | 5/1991 | France | 356/305 |

OTHER PUBLICATIONS

NASA Tech Briefs, Mar. 1998, Convex–Grating Spectrometer With Two Spherical Mirrors.
Optical Engineering, Apr. 1987, "Annular Field systems and the Future of Optical Icrolithography".
Applied Optics, Dec. 1977, "Concentric Spectrographs".
Applied Optics, Nov. 1998, "Convex Grating Types for Concentric Imaging Spectrometers".

*Primary Examiner*—F. L. Evans
*Attorney, Agent, or Firm*—Price, Heneveld, Cooper, DeWitt & Litton

[57] ABSTRACT

A detection system for an atomic emission spectrometer includes a spherical convex diffraction grating having a radius of curvature which is one-half the radius of curvature of a pair of concave spherical mirrors. The diffraction grating and mirrors are positioned within a chamber such that their centers of curvature coincide at the focal plane to which a plurality of relatively small spaced-apart linear detectors are positioned on opposite sides of an emission entry slit to provide detection of alternate segments of a spectral band of wavelengths of interest.

27 Claims, 2 Drawing Sheets

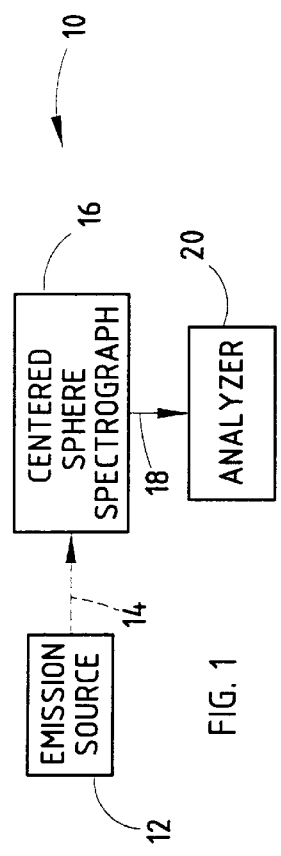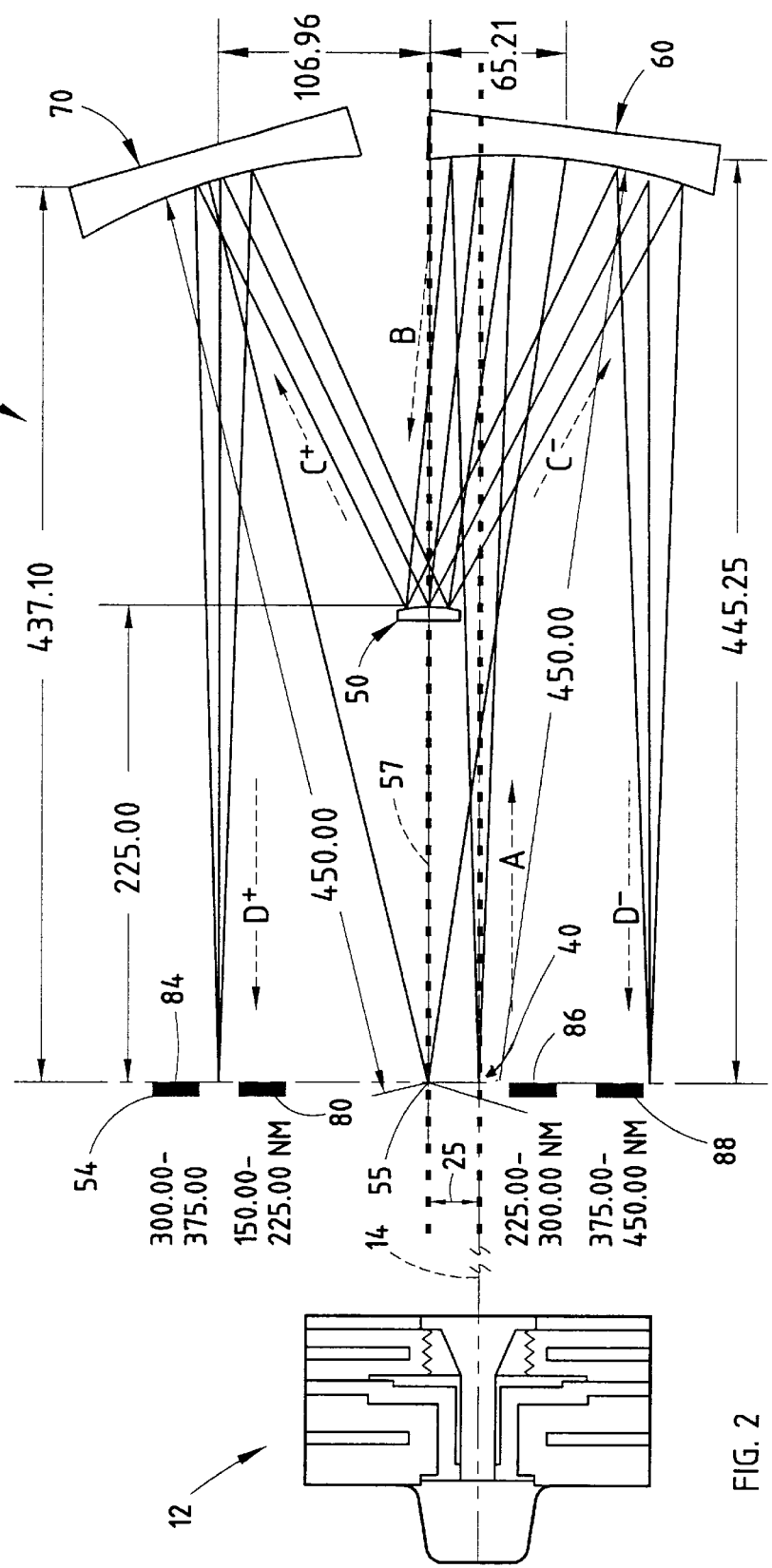

CENTERED SPHERE SPECTROMETER

BACKGROUND OF THE INVENTION

The present invention relates to an atomic emission spectrometer and particularly to a unique diffraction grating, mirror and detector arrangement.

Spectrometers typically employ a diffraction grating which are concave and one or more mirrors in which incoming spectral emissions are directed toward the diffraction grating which divides the incoming emission spectra into different spectral bands then rereflected by a mirror onto a detector. The detector is a somewhat elongated array of photo detectors over the image plan which typically is not flat and, therefore, results in some field curvature reducing the image quality and, thus, the spectral coverage available. Also, such elongated detector arrays are somewhat expensive. If multiple arrays are employed to access adjoining wavelength regions, they must be physical placed in juxtaposition which results in physical interference between such detectors. Accordingly, although convex diffraction gratings have resulted in improvements in spectrometers, significant problems remain with respect to the ability to divide the incoming spectral emissions into physically distinct and detectable frequency bands.

SUMMARY OF THE INVENTION

The system of the present invention overcomes the difficulty with prior spectrometers by providing a spherical convex diffraction grating having a radius of curvature which is one-half the radius of curvature of one or more concave spherical mirrors employed with the diffraction grating. The diffraction grating and mirrors are positioned within a chamber such that their center of curvature coincide at the focal plane which is a flat field focal plane to which a plurality of relatively small spaced linear detectors are positioned on opposite sides of the emission entry slit. This arrangement results in two dispersion planes in + and − diffraction orders to provide detection of alternate segments of a band of wavelength of interest which are physically spaced on opposite sides of the entrance slit. Such an arrangement eliminates the need for expensive elongated single detectors and allows a plurality of relatively inexpensive flat linear detectors to be employed for effectively detecting the desired spectral range without interference from adjacent detectors. This arrangement provides full spectral coverage over a desired band of wavelengths, avoids physical interference between multiple detectors and provides better conformance to the dispersion plane by use of relatively small detectors which conform better to the focal plane resulting in better overall performance for a wider wavelength coverage than previously available.

These and other features, objects and advantages of the present invention will become apparent upon reading the following description thereof together with reference to the accompanying drawings.

BRIEF DESCRIPTION OF THE DRAWINGS

FIG. 1 is a block diagram of a spectrometer embodying the centered sphere detection system of the present invention;

and FIG. 2 is an optical diagram of the detection system also showing the emission source;

DETAILED DESCRIPTION OF THE PREFERRED EMBODIMENT

Figure 3:
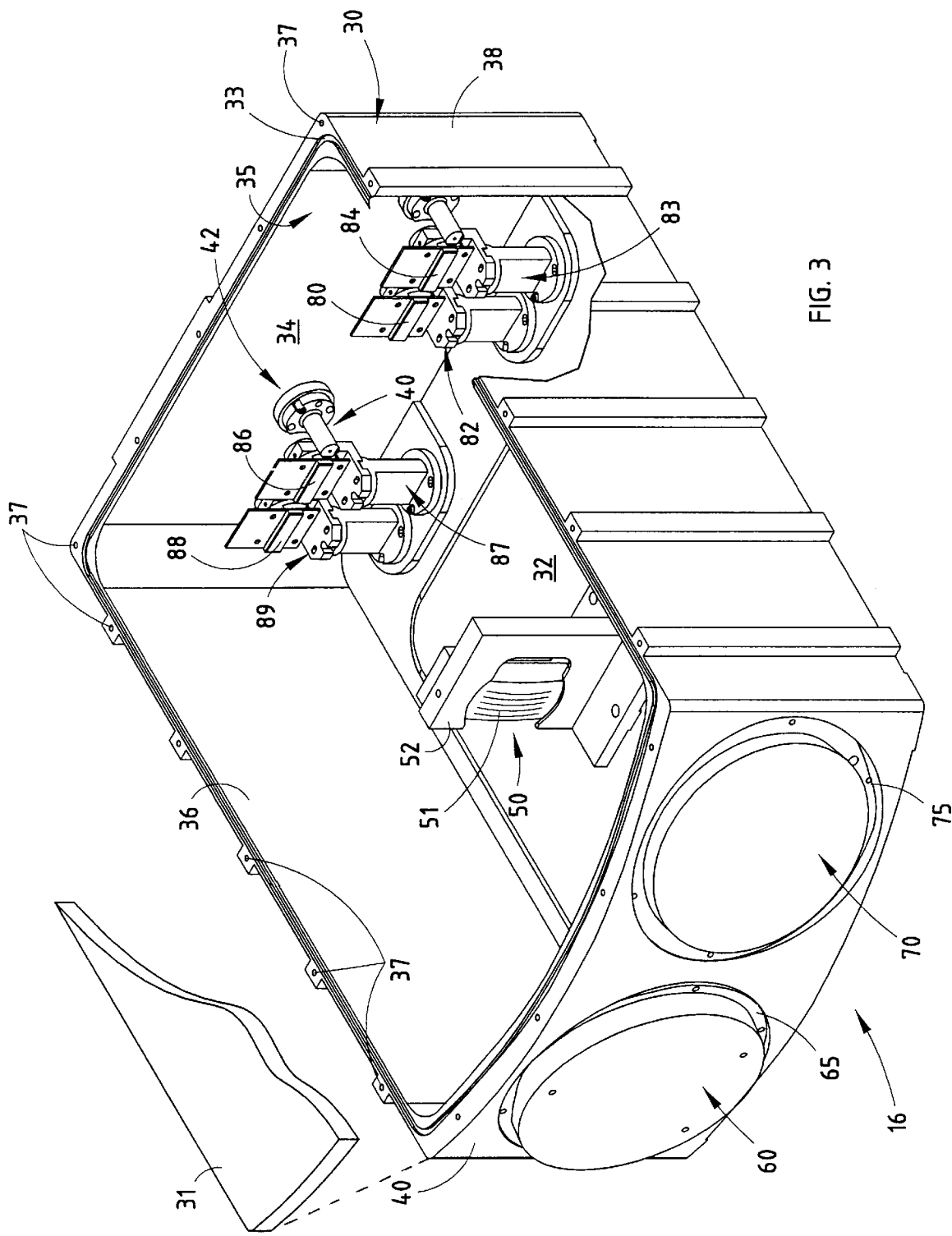
FIG. 3 is a fragmentary partly broken-away and exploded perspective view of the detection system shown in FIG. 2.

Referring initially to FIG. 1, there is shown an atomic emission spectrometer 10 embodying the present invention. The spectrometer typically will be housed in a cabinet including an emission source 12, such as a glow-discharge emission source, although other emission sources such as arc-spark, inductive coupled plasma or laser ablation sources can also be employed. A sample is conventionally placed in a sample chamber associated with the emission source 12 which emits a spectral emission 14 of optical energy including wavelengths of light emitted from elements contained by the specimen. The spectral emission 14 is focused on an entrance slit 40 (FIGS. 2 and 3) of the centered sphere detection system 16 of the present invention. As described in greater detail below, the detection system includes a chamber having a convex diffraction grating and a pair of spherical mirrors and a plurality of spaced-apart linear detectors. The detectors are coupled by electrical conductors 18 to a microprocessor controlled analyzer 20 which processes the signal information and provides the operator with a display and/or printout of the characteristics of the elements detected which are contained in the sample, including which elements and their concentration. The emission source and analyzer can generally be of the type which are commercial available from Leco Corporation of St. Joseph, Mich., Model Nos. GDS400A or GDS750A. The improvement of the present invention comprises the detection system 16 which is now described in greater detail below in connection with FIGS. 2 and 3.

Initially, it should be noted that the optical diagram of FIG. 2 is scaled with the actual dimensions shown on the drawing. In FIG. 2, the emission source 12 and its spacing from detection system 16, however, is pictorially represented. The detection system 16, as seen in the fragmentary perspective view of FIG. 3, includes a chamber defamed by a housing 30 with a floor 32, a front wall 34, side walls 36 and 38, a rear wall 40, and a removable top 31 providing access to the chamber 35 into which the optical elements are mounted. The housing typically will be placed within the instrument 10 in a temperature-stable environment and may be operated either under vacuum or under other controlled atmospheric conditions. In a preferred embodiment, the housing was approximately 18"w×18"l×7"h with the walls integrally formed of a suitable die cast metal and the floor 32 and top sealably secured to the walls using an O-ring seal positioned within grooves 33 (FIG. 3) in the ends of the walls and threaded fasteners extending into threaded apertures 37.

The detection system 16 includes an entrance slit 40 mounted to front wall 34 by a conventional mounting assembly 42. In the preferred embodiment of the invention, the entrance slit was generally rectangular having a dimension of 1 mm by 14 microns and receives the spectral emission 14 (FIGS. 1 and 2) from the emission source 12 typically through a focusing lens for focusing the light energy onto the entrance slit. Positioned centrally within the chamber 35 of housing 30 is a spherical convex diffraction grating 50 having its gratings 51 arranged orthogonally to the plane of symmetry of the focal plane 54 (FIG. 2) of the spectrometer (i.e., generally vertically in FIG. 3 and into and out of the plane of the drawing of FIG. 2). The grating 50 is positioned in an adjustable mount 52 of generally well-known construction for allowing its precise alignment. The radius of curvature of the spherical convex diffraction grating 50 is one-half of that of each of a pair of two concave spherical mirrors 60 and 70 mounted to the rear wall 40 of the housing 30 by means of adjustable bracket assemblies 65 and 75, respectively. The diffraction grating is positioned, in the preferred embodiment of the invention, at a distance of 225 mm from the focal plane 54 (spaced in front of front wall 34) and centrally located as best seen in FIG. 2. The center of curvature of the diffraction grating falls on the focal plane 54 at a common center of curvature 55 (FIG. 2) for the radius of curvature for the grating as well as the radius of curvature for each of the mirrors 60 and 70, which have a radius of curvature of 450 mm or exactly twice that of the grating radius of curvature.

The mirrors 60 and 70 are spherically ground mirrors positioned with a first mirror 60 having its center 65.21 mm below the central axis 57 of the optical grating. Mirror 70 is positioned with its center located 106.96 mm above the centerline 57 as viewed in FIG. 2. The mirrors are adjusted such that their centers of curvature align with the center of curvature 55, which is offset above (in FIG. 2) the entrance slit 40 a distance of 25 mm. The diffraction grating 50 conventionally includes a reflective front surface while the mirrors 60 and 70 are precisely ground, generally circular mirrors having a reflective front surface and a diameter of approximately 5½". Mounted to floor 32 in front of the inner surface of front wall 34 of the housing 30 is a first linear detector 80 by means of a bracket assembly 82 allowing its precise angle and spatial alignment. A second linear detector array 84 is also mounted by brackets 83 to floor 32. Detectors 80 and 84 are mounted on one side of the entrance slit 40, while on the opposite side there is mounted a third detector 86 by means of a mounting bracket 87 and a fourth detector 88 by means of a mounting bracket assembly 89. Each of the detectors are relatively small, solid state, linear detectors and can be of the type commercially available from Sony Semiconductors Model Nos. ILX526A comprising a CCD linear image sensor, which are relatively small and inexpensive providing a pixel detection of approximately 3000, with the pixel size being approximately 7 micrometers by 200 micrometers. The physical dimensions of the relatively small DIP 22 pin detector packages are approximately 10 mm in width and 32 mm in height. Bracket assemblies 82, 83, 87 and 89 are angularly and linearly adjustable in a conventional manner to position the detectors to allow their precise optical alignment as illustrated by the diagram in FIG. 2 with respect to mirrors 60 and 70 and grating 50 such that segments of a spectral band being analyzed are alternately focused on the first, third, second and fourth detectors, respectively, as described in greater detail below, due to the radius of curvature and placement of the mirrors and grating.

Referring now to FIG. 2 showing the optical diagram of the placement of the optical and detecting elements of the detection system 16 shown in FIG. 3, it is seen that the optical emission spectrum 14 from source 12 is focused on entrance slit 40 and is represented by beam A in FIG. 2. Beam A impinges upon the surface of mirror 60 and is reflected as beam B onto grating 50. The grating divides the impinging optical energy into first and –first order defracted wavelengths with the first order (plus order) C+ being directed toward spherical mirror 70 and the –first order C– wavelength being directed toward mirror 60. Mirror 70 directs, as indicated by reflected energy D+, the impinging optical energy onto the focal plane 54 dividing the spectral energy into discrete segments of the wavelength band. Concurrently, the C– energy is reflected by mirror 60 as indicated by D– onto the focal plane 54 in discrete spectrally segmented and physically separated bands. In the preferred embodiment shown in FIG. 2, the optical element dimensions are selected to provide continuous coverage for a wavelength band of from about 150 nanometers (nm) to 450 nm.

The first detector 80 is positioned to detect the plus spectral range of from 150 nm to 225 nm. In the minus first order reflected energy band, the next adjacent segment of the spectral band detected is reflected by mirror 60 onto detector 86 and includes wavelengths of from about 225 nm to about 300 nm. Thus, adjacent segments of the spectral band are focused by mirrors 60 and 70 on greatly spaced-apart linear sensors 80 and 86 on opposite sides of entrance slit 40. Similarly, the plus order spectral band (D+) from 300 to 375 nm is reflected by mirror 70 onto detector 84 while the next adjacent segment of the spectral band (D–), including wavelengths from 375 nm to 450 nm, are projected onto detector 88. Thus, adjacent segments of the spectral band are reflected into alternately staggered and spaced-apart small linear image sensors 80, 84, 86 and 88 mounted to housing 30 as seen in FIG. 3. As seen in the optical diagram of FIG. 2, the spacing and positioning of the optical elements in millimeters is shown for the spectral band of 150 nm to 450 nm of the preferred embodiment. It is understood that for different spectral bands the dimensions will vary as required to reflect the first and –first order emission wavelengths to spaced-apart detectors.

The geometry selected in positioning concave spherical mirrors having a radius of curvature twice that of the spherical convex diffraction grating and positioning them with a common center of curvature provides near Littrow grating illumination and results in the alternate spacing of adjacent segments of first and –first order sections of the spectral bands falling on two dispersion planes, allowing the use of relatively small, inexpensive spaced-apart linear image sensors to detect a continuous spectra of light energy with a minimum of interference among adjacent detectors. This allows the physical spacing of the relatively small flat detectors which can greatly improve their alignment with the focal plane which is not entirely flat but somewhat curved and allow the accurate detection of wavelengths of light throughout the spectrum of interest. In some embodiments, a single concave spherical mirror could be employed to divide the spectral band but with less continuous coverage. Signals from the detectors 80, 84, 86 and 88 are applied to the analyzer 20 (FIG. 1) and processed in a conventional manner to provide the operator with the information on a given specimen placed within the emission source 12.

It will become apparent to those skilled in the art that various modifications to the preferred embodiment of the invention as described herein can be made without departing from the spirit or scope of the invention as defamed by the appended claims.

The invention claimed is:

1. A centered sphere detection system for an atomic emission spectrometer comprising:

a chamber having an entrance slit;

a spherical convex diffraction grating positioned within said chamber and aligned along a center axis offset from said entrance slit and having a first radius of curvature;

a first concave spherical mirror having a radius of curvature approximately twice that of said diffraction grating positioned in offset relationship to said center axis of said grating in a first direction with the center of curvature of said mirror coincident with the center of curvature of said diffraction grating;

a second concave spherical mirror having a radius of curvature approximately twice that of said diffraction grating and positioned on a side of said center axis opposite said first mirror and aligned with its center of curvature coincident with that of said first mirror and said diffraction grating for providing spaced-apart + and – diffraction orders; and a plurality of spaced-apart image sensors positioned along the focal plane of said mirrors in spaced relationship from one another for receiving optical energy reflected by said first and second mirrors.

2. The detection system as defined in claim 1 wherein said plurality of linear image sensors includes at least one sensor positioned in said chamber on one side of said entrance slit and at least one sensor positioned in said chamber on an opposite side of said entrance slit.

3. The detection system as defined in claim 2 wherein a pair of spaced-apart sensors are mounted in said chamber on opposite sides of said entrance slit.

4. The detection system as defined in claim 2 wherein said chamber is defined by a housing having side walls, a floor and a removable cover and wherein said diffraction grating is mounted to a control location on said floor.

5. The detection system as defined in claim 4 wherein the radius of curvature of said diffraction grating is about 225 mm.

6. The detection system as defined in claim 5 wherein said mirrors each have a radius of curvature of about 450 mm.

7. The detection system as defined in claim 6 wherein said entrance slit is formed in one wall of said housing approximately 25 mm offset from the center of curvature of said mirrors.

8. The detection system as defined in claim 7 including an adjustable mounting bracket for said diffraction grating.

9. The detection system as defined in claim 8 and including an adjustable mounting bracket for mounting each of said sensors to said floor of said housing.

10. The detection system as defined in claim 9 and including an adjustable mounting bracket for mounting each of said mirrors to a wall of said housing.

11. A centered sphere detection system for an atomic emission spectrometer comprising:

a housing defining a chamber, said housing having an entrance slit for receiving light emissions from a sample to be analyzed;

a convex diffraction grating positioned within said housing and aligned along a center axis offset from said entrance slit and having a first radius of curvature;

a concave spherical mirror having a radius of curvature approximately twice that of said diffraction grating positioned in offset relationship from the center of said grating in a first direction with the center of curvature of said mirror coincident with the center of curvature of said diffraction grating; and a plurality of spaced-apart linear image sensors mounted in said housing to be positioned along the focal plane of said mirror in spaced relationship from one another for receiving optical energy reflected by said mirror.

12. The detection system as defined in claim 11 wherein the radius of curvature of said diffraction grating is about 225 mm.

13. The detection system as defined in claim 12 wherein said mirror has a radius of curvature of about 450 mm.

14. The detection system as defamed in claim 13 wherein said entrance slit is formed in one wall of said housing approximately 25 mm offset from the center of curvature of said mirror.

15. The detection system as defined in claim 14 and further including a second mirror having a radius of curvature of about 450 mm, said second mirror mounted in said housing on a side of said center axis opposite said first mirror.

16. The detection system as defined in claim 15 wherein said plurality of linear image sensors includes at least one sensor positioned in said chamber on one side of said entrance slit and at least one sensor positioned in said chamber on an opposite side of said entrance slit.

17. The detection system as defined in claim 16 wherein a pair of spaced-apart sensors are mounted in said chamber on opposite sides of said entrance slit.

18. A centered sphere spectrometer comprising:

an emission source of optical energy to be analyzed;

a housing having an entrance slit;

a convex spherical diffraction grating positioned within said housing and aligned along a center axis offset from said entrance slit and having a first radius of curvature;

a first concave spherical mirror having a radius of curvature approximately twice that of said diffraction grating and positioned in said housing in offset relationship from said center axis in a first direction, said first mirror such that its center of curvature is coincident with the center of curvature of said diffraction grating;

a second concave spherical mirror having a radius of curvature approximately twice that of said diffraction grating and positioned in said housing on a side of said center axis opposite said first mirror and aligned with its center of curvature coincident with that of said first mirror and said diffraction grating;

a plurality of spaced-apart linear image detectors positioned along the focal plane of said first and second mirrors in spaced relationship from one another for receiving optical energy reflected by said first and second mirrors; and an analyzer coupled to said detectors for analyzing the spectral information detected by said detectors.

19. The detection system as defined in claim 18 wherein said plurality of linear image detectors includes at least one detector positioned in said housing on one side of said entrance slit and at least one detector positioned in said housing on an opposite side of said entrance slit.

20. The detection system as defined in claim 19 wherein a pair of spaced-apart detectors are mounted in said housing on opposite sides of said entrance slit.

21. The detection system as defined in claim 20 wherein said housing is defined by side walls, a floor and a removable cover and wherein said diffraction grating is mounted to a control location on said floor.

22. The detection system as defined in claim 21 wherein the radius of curvature of said diffraction grating is about 225 mm.

23. The detection system as defined in claim 22 wherein said mirrors each have a radius of curvature of about 450 mm.

24. The detection system as defined in claim 23 wherein said entrance slit is formed in one wall of said housing approximately 25 mm offset from the center of curvature of said mirrors.

25. The detection system as defined in claim 24 including an adjustable mounting bracket for said diffraction grating.

26. The detection system as defined in claim 25 and including an adjustable mounting bracket for mounting each of said detectors to said floor of said housing.

27. The detection system as defined in claim 26 and including an adjustable mounting bracket for mounting each of said mirrors to a wall of said housing.

* * * * *

UNITED STATES PATENT AND TRADEMARK OFFICE
CERTIFICATE OF CORRECTION

PATENT NO. : 6,023,330
DATED : February 8, 2000
INVENTOR(S) : Marshall, et al.

It is certified that errors appear in the above-identified patent and that said Letters Patent is hereby corrected as shown below:

Col. 1, line 17;
    "physical" should be - -physically- -;

Col. 1, line 31;
    "center" should be - -centers- -;

Col. 1, line 59;
    before "Fig. 2" delete - -and- -;

Col. 1, line 60;
    after "source" insert - -and- -;

Col. 2, line 22;
    "are commercial" should be - -is commercially- -;

Col. 4, line 34;
    "allow" should be - -allows- -;

UNITED STATES PATENT AND TRADEMARK OFFICE
CERTIFICATE OF CORRECTION

PATENT NO.   :  6,023,330
DATED        :  February 8, 2000
INVENTOR(S)  :  Marshall, et al.

It is certified that errors appear in the above-identified patent and that said Letters Patent is hereby corrected as shown below:

Col. 5, claim 14, line 58;
    "defamed" should be - -defined- -;

Signed and Sealed this

Thirteenth Day of March, 2001

Attest:

NICHOLAS P. GODICI

*Attesting Officer*    *Acting Director of the United States Patent and Trademark Office*